(12) United States Patent
Britt et al.

(10) Patent No.: US 10,984,654 B2
(45) Date of Patent: Apr. 20, 2021

(54) COOPERATIVE TRAFFIC FLOW OPTIMIZATION

(71) Applicant: International Business Machines Corporation, Armonk, NY (US)

(72) Inventors: David T. Britt, Greensboro, NC (US); Thorsten Busch, Bad Kreuznach (DE); Angela Boone, Gibsonville, NC (US)

(73) Assignee: International Business Machines Corporation, Armonk, NY (US)

(*) Notice: Subject to any disclaimer, the term of this patent is extended or adjusted under 35 U.S.C. 154(b) by 285 days.

(21) Appl. No.: 16/126,443

(22) Filed: Sep. 10, 2018

(65) Prior Publication Data
US 2020/0082716 A1 Mar. 12, 2020

(51) Int. Cl.
G08G 1/09 (2006.01)
G01C 21/34 (2006.01)
G08G 1/01 (2006.01)

(52) U.S. Cl.
CPC .......... G08G 1/09 (2013.01); G01C 21/3492 (2013.01); G08G 1/0145 (2013.01)

(58) Field of Classification Search
CPC .... G08G 1/09; G08G 1/0145; G01C 21/3492; G05D 1/0217; G05D 1/0287
See application file for complete search history.

(56) References Cited

U.S. PATENT DOCUMENTS

| | | | |
|---|---|---|---|
| 8,352,111 B2* | 1/2013 | Mudalige | G08G 1/163 701/24 |
| 8,897,998 B2 | 11/2014 | Alpert et al. | |
| 9,355,423 B1* | 5/2016 | Slusar | G08G 1/0112 |
| 2010/0256852 A1 | 10/2010 | Mudalige | |
| 2012/0068858 A1 | 3/2012 | Fredkin | |
| 2012/0109421 A1 | 5/2012 | Scarola | |
| 2013/0297197 A1 | 11/2013 | Zhai et al. | |
| 2015/0154871 A1* | 6/2015 | Rothoff | G05D 1/0295 701/2 |

OTHER PUBLICATIONS

IP.Com, "On-demand contraflow through vehicles collaboration", Mar. 21, 2012, 3 pages.

* cited by examiner

*Primary Examiner* — Thomas Ingram
(74) *Attorney, Agent, or Firm* — Robert J. Shatto; Madeline F. Schiesser; Keohane & D'Alessandro, PLLC

(57) ABSTRACT

Approaches presented herein enable cooperative traffic flow optimization. More specifically, a current position and route information for a plurality of vehicles traveling on a road segment are obtained. Common routes between the vehicles are determined and a first longest common route between two first vehicles is identified. A first vehicle chain navigation instruction based on the identified route is generated and sent to the two first vehicles, instructing the two vehicles to form a first vehicle chain. Further common routes are determined among the vehicles and the vehicle chain using the route information and a second longest common route is identified between a second vehicle and: another vehicle or the first vehicle chain. A second vehicle chain navigation instruction is generated instructing the second vehicle to form a second vehicle chain with the other vehicle or to join the first vehicle chain.

20 Claims, 13 Drawing Sheets

FIG. 5A

| VEHICLES AT OP | ROUTE | | |
|---|---|---|---|
| CAR 1 | 92A 40 | 92B 50 | |
| CAR 2 | 92A 40 | 93B 30 | 93C 50 |
| CAR 3 | 92A 40 | 93A 50 | |
| CAR 4 | 92A 40 | 93B 30 | 94B 50 |
| CAR 5 | 92A 40 | 93B 30 | 94A 50 |
| CAR 6 | 92A 40 | 93B 30 | 93C 100 |
| CAR 7 | 92A 40 | 92B 100 | |
| CAR 8 | 92A 40 | 93B 30 | 94A 100 |
| CAR 9 | 92A 40 | 93B 30 | 94A 120 |

FIG. 5B

LENGTH OF COMMON ROUTES

| | CAR 1 | CAR 2 | CAR 3 | CAR 4 | CAR 5 | CAR 6 | CAR 7 | CAR 8 | CAR 9 |
|---|---|---|---|---|---|---|---|---|---|
| CAR 1 | | | | | | | | | |
| CAR 2 | 40 | | | | | | | | |
| CAR 3 | 40 | 40 | | | | | | | |
| CAR 4 | 40 | 70 | 40 | | | | | | |
| CAR 5 | 40 | 70 | 40 | 70 | | | | | |
| CAR 6 | 40 | 120 | 40 | 70 | 70 | | | | |
| CAR 7 | 90 | 40 | 40 | 40 | 40 | 40 | | | |
| CAR 8 | 40 | 70 | 40 | 70 | 120 | 70 | 40 | | |
| CAR 9 | 40 | 70 | 40 | 70 | 120 | 70 | 40 | 170 | |

FIG. 6A

| VEHICLES AT OP | ROUTE | | | |
|---|---|---|---|---|
| CAR 1 | 92A | 92B | | |
| | 40 | 50 | | |
| CAR 2 | 92A | 93B | 93B | |
| | 40 | 30 | 50 | |
| CAR 3 | 92A | 93A | | |
| | 40 | 50 | | |
| CAR 4 | 92A | 93B | 94C | |
| | 40 | 30 | 50 | |
| CAR 5 | 92A | 93B | 94A | |
| | 40 | 30 | 50 | |
| CAR 6 | 92A | 93B | 93C | |
| | 40 | 30 | 100 | |
| CAR 7 | 92A | 92B | | |
| | 40 | 100 | | |
| CAR 8 | 92A | 93B | 94A | |
| | 40 | 30 | 100 | |
| CAR 9 | 92A | 93B | 94A | |
| | 40 | 30 | 120 | |

FIG. 6B

| | \multicolumn{9}{c}{LENGTH OF COMMON ROUTES} |
|---|---|---|---|---|---|---|---|---|---|

| | CAR 1 | CAR 2 | CAR 3 | CAR 4 | CAR 5 | CAR 6 | CAR 7 | CAR 8 | CAR 9 |
|---|---|---|---|---|---|---|---|---|---|
| CAR 1 |   |   |   |   |   |   |   |   |   |
| CAR 2 | 40 |   | 40 |   |   |   |   |   |   |
| CAR 3 | 40 | 40 |   |   |   |   |   |   |   |
| CAR 4 | 40 | 70 | 40 |   | 70 |   |   |   |   |
| CAR 5 | 40 | 70 | 40 | 70 |   |   |   |   |   |
| CAR 6 | 40 | 120 | 40 | 70 | 70 |   |   |   |   |
| CAR 7 | 90 | 40 | 40 | 40 | 40 | 40 |   |   |   |
| CAR 8 | 40 | 70 | 40 | 70 | 120 | 70 | 40 |   |   |
| CAR 9 | 40 | 70 | 40 | 70 | 120 | 70 | 40 | 170 |   |

FIG. 6C

| CHAINS |
|---|
| CHAIN 101 |
| CAR 8 |
| CAR 9 |

FIG. 7A

| VEHICLES AT OP | ROUTE | | |
|---|---|---|---|
| CAR 1 | 92A 40 | 92B 50 | |
| CAR 2 | 92A 40 | 93B 30 | 93B 50 |
| CAR 3 | 92A 40 | 93A 50 | |
| CAR 4 | 92A 40 | 93B 30 | 94C 50 |
| CAR 5 | 92A 40 | 93B 30 | 94A 50 |
| CAR 6 | 92A 40 | 93B 30 | 93C 100 |
| CAR 7 | 92A 40 | 92B 100 | |
| CAR 8 | 92A 40 | 93B 30 | 94A 100 |
| CAR 9 | 92A 40 | 93B 30 | 94A 120 |

FIG. 7B

| | LENGTH OF COMMON ROUTES | | | | | | | | |
|---|---|---|---|---|---|---|---|---|---|
| | CAR 1 | CAR 2 | CAR 3 | CAR 4 | CAR 5 | CAR 6 | CAR 7 | CAR 8 | CAR 9 |
| CAR 1 | | | | | | | | | |
| CAR 2 | 40 | | | | | | | | |
| CAR 3 | 40 | 40 | | | | | | | |
| CAR 4 | 40 | 70 | 40 | | | | | | |
| CAR 5 | 40 | 70 | 40 | 70 | | | | | |
| CAR 6 | 40 | 120 | 40 | 70 | 70 | | | | |
| CAR 7 | 90 | 40 | 40 | 40 | 40 | 40 | | | |
| CAR 8 | 40 | 70 | 40 | 70 | 120 | 70 | 40 | | |
| CAR 9 | 40 | 70 | 40 | 70 | 120 | 70 | 40 | 170 | |

FIG. 7C

| CHAINS | |
|---|---|
| CHAIN 101 | CHAIN 102 |
| CAR 8 | CAR 2 |
| CAR 9 | CAR 6 |

FIG. 8A

| VEHICLES AT OP | ROUTE | | | |
|---|---|---|---|---|
| CAR 1 | 92A 40 | 92B 50 | | |
| CAR 2 | 92A 40 | 93B 30 | 93B 50 | |
| CAR 3 | 92A 40 | 93A 50 | | |
| CAR 4 | 92A 40 | 93B 30 | 94C 50 | |
| CAR 5 | 92A 40 | 93B 30 | 94A 50 | |
| CAR 6 | 92A 40 | 93B 30 | 93C 100 | |
| CAR 7 | 92A 40 | 92B 100 | | |
| CAR 8 | 92A 40 | 93B 30 | 94A 100 | |
| CAR 9 | 92A 40 | 93B 30 | 94A 120 | |

FIG. 8B

| | LENGTH OF COMMON ROUTES | | | | | | | | |
|---|---|---|---|---|---|---|---|---|---|
| | CAR 1 | CAR 2 | CAR 3 | CAR 4 | CAR 5 | CAR 6 | CAR 7 | CAR 8 | CAR 9 |
| CAR 1 | | | | | | | | | |
| CAR 2 | 40 | | | | | | | | |
| CAR 3 | 40 | 40 | | | | | | | |
| CAR 4 | 40 | 70 | 40 | | | | | | |
| CAR 5 | 40 | 70 | 40 | 70 | | | | | |
| CAR 6 | 40 | 120 | 40 | 40 | 70 | | | | |
| CAR 7 | 90 | 40 | 40 | 40 | 40 | 40 | | | |
| CAR 8 | 40 | 70 | 40 | 70 | 120 | 70 | 40 | | |
| CAR 9 | 40 | 70 | 40 | 70 | 120 | 70 | 40 | 170 | |

FIG. 8C

| CHAINS | |
|---|---|
| CHAIN 101 | CHAIN 102 |
| CAR 5 | CAR 2 |
| CAR 8 | CAR 6 |
| CAR 9 | |

FIG. 9A

| VEHICLES AT OP | ROUTE | | | |
|---|---|---|---|---|
| CAR 1 | 92A 40 | 92B 50 | | |
| CAR 2 | 92A 40 | 93B 30 | 93B 50 | |
| CAR 3 | 92A 40 | 93A 50 | | |
| CAR 4 | 92A 40 | 93B 30 | 94C 50 | |
| CAR 5 | 92A 40 | 93B 30 | 94A 50 | |
| CAR 6 | 92A 40 | 93B 30 | 93C 100 | |
| CAR 7 | 92A 40 | 92B 100 | | |
| CAR 8 | 92A 40 | 93B 30 | 94A 100 | |
| CAR 9 | 92A 40 | 93B 30 | 94A 120 | |

FIG. 9B

LENGTH OF COMMON ROUTES

| | CAR 1 | CAR 2 | CAR 3 | CAR 4 | CAR 5 | CAR 6 | CAR 7 | CAR 8 | CAR 9 |
|---|---|---|---|---|---|---|---|---|---|
| CAR 1 | | | | | | | | | |
| CAR 2 | 40 | | | | | | | | |
| CAR 3 | 40 | 40 | | | | | | | |
| CAR 4 | 40 | 70 | 40 | | | | | | |
| CAR 5 | 40 | 70 | 40 | 70 | | | | | |
| CAR 6 | 40 | 120 | 40 | 40 | 70 | | | | |
| CAR 7 | 90 | 40 | 40 | 40 | 40 | 40 | | | |
| CAR 8 | 40 | 70 | 40 | 70 | 120 | 40 | 40 | | |
| CAR 9 | 40 | 70 | 40 | 70 | 120 | 40 | 40 | 170 | |

FIG. 9C

| CHAINS | | |
|---|---|---|
| CHAIN 101 | CHAIN 102 | CHAIN 103 |
| CAR 5 | CAR 2 | CAR 1 |
| CAR 8 | CAR 6 | CAR 7 |
| CAR 9 | | |

FIG. 10A

| VEHICLES AT OP | ROUTE | | |
|---|---|---|---|
| CAR 1 | 92A 40 | 92B 50 | |
| CAR 2 | 92A 40 | 93B 30 | 93C 50 |
| CAR 3 | 92A 40 | 93A 50 | |
| CAR 4 | 92A 40 | 93B 30 | 94B 50 |
| CAR 5 | 92A 40 | 93B 30 | 94A 50 |
| CAR 6 | 92A 40 | 93B 30 | 93C 100 |
| CAR 7 | 92A 40 | 92B 100 | |
| CAR 8 | 92A 40 | 93B 30 | 94A 100 |
| CAR 9 | 92A 40 | 93B 30 | 94A 120 |

FIG. 10B

| LENGTH OF COMMON ROUTES | CAR 1 | CAR 2 | CAR 3 | CAR 4 | CAR 5 | CAR 6 | CAR 7 | CAR 8 | CAR 9 |
|---|---|---|---|---|---|---|---|---|---|
| CAR 1 | | | | | | | | | |
| CAR 2 | 40 | | | | | | | | |
| CAR 3 | 40 | 40 | | | | | | | |
| CAR 4 | 40 | 70 | 40 | | | | | | |
| CAR 5 | 40 | 70 | 40 | 70 | | | | | |
| CAR 6 | 40 | 120 | 40 | 70 | 70 | | | | |
| CAR 7 | 90 | 40 | 40 | 40 | 40 | 40 | | | |
| CAR 8 | 40 | 70 | 40 | 70 | 120 | 70 | 40 | | |
| CAR 9 | 40 | 70 | 40 | 70 | 120 | 70 | 40 | 170 | |

FIG. 10C

| CHAINS | | |
|---|---|---|
| CHAIN 101 | CHAIN 102 | CHAIN 103 |
| CAR 4 | CAR 2 | CAR 1 |
| CAR 5 | CAR 6 | CAR 7 |
| CAR 8 | | |
| CAR 9 | | |

FIG. 11A

| VEHICLES AT OP | ROUTE | | |
|---|---|---|---|
| CAR 1 | 92A 40 | 92B 50 | |
| CAR 2 | 92A 40 | 93B 30 | 93C 50 |
| CAR 3 | 92A 40 | 93A 50 | |
| CAR 4 | | | |
| CAR 5 | 92A 40 | 93B 30 | 94B 50 |
| CAR 6 | 92A 40 | 93B 30 | 94A 50 |
| CAR 7 | 92A 40 | 93B 30 | 93C 100 |
| CAR 8 | 92A 40 | 92B 100 | 94A 100 |
| CAR 9 | 92A 40 | 93B 30 | 94A 120 |

FIG. 11B

| LENGTH OF COMMON ROUTES | CAR 1 | CAR 2 | CAR 3 | CAR 4 | CAR 5 | CAR 6 | CAR 7 | CAR 8 | CAR 9 |
|---|---|---|---|---|---|---|---|---|---|
| CAR 1 | | | | | | | | | |
| CAR 2 | 40 | | | | | | | | |
| CAR 3 | 40 | 40 | | | | | | | |
| CAR 4 | 40 | 70 | 40 | | | | | | |
| CAR 5 | 40 | 70 | 40 | 70 | | | | | |
| CAR 6 | 40 | 120 | 40 | 70 | 70 | | | | |
| CAR 7 | 90 | 40 | 40 | 40 | 40 | 40 | | | |
| CAR 8 | 40 | 70 | 40 | 70 | 40 | 40 | 40 | | |
| CAR 9 | 40 | 70 | 40 | 70 | 120 | 120 | 40 | 170 | |

FIG. 11C

| CHAINS | | |
|---|---|---|
| CHAIN 101 | CHAIN 102 | CHAIN 103 |
| CAR 4 | CAR 3 | CAR 1 |
| CAR 5 | CAR 2 | CAR 7 |
| CAR 8 | CAR 6 | |
| CAR 9 | | |

COOPERATIVE TRAFFIC FLOW OPTIMIZATION

TECHNICAL FIELD

The present invention relates generally to improvements in vehicle navigation systems and, more specifically, to optimizing vehicle navigation systems to reduce traffic congestion.

BACKGROUND

Motor vehicle drivers are, in general, increasingly relying upon computerized navigation systems, such as GPS-based smart phone applications, to get from one place to another. As driver dependence on directions outputted by such computerized navigation systems grows, these same drivers' ability to navigate for themselves may wither. Some drivers may essentially blindly follow the navigation system's directions, failing to recognize for themselves important navigational tools (e.g., street signs, landmarks) and failing to anticipate upcoming turns and road changes. As a result, navigation systems may cause drivers to take sudden, risky actions as the driver receives new directions and only then realizes that he or she is, for example, in the wrong lane to make a turn, access a ramp, or pull into a destination.

Furthermore, when each driver is only concerned with his or her own vehicle, multiple vehicles may end up jockeying for positions in a multi-lane roadway. For example, if the drivers of two vehicles in the left lane of a roadway both are informed by their navigation systems that they should take a right-hand exit ramp, and only then realize that they should be in the right lane in order to access the right-hand exit ramp, the drivers may find themselves competing for the same position in the right lane. Moreover, another driver, coming from a right-hand entrance ramp onto that roadway, may find himself with no room to merge left due to these other vehicles jockeying in the right lane. As such, a navigation system that instructs drivers individually, without consideration for the navigation of nearby vehicles, may result in potentially dangerous traffic congestion.

SUMMARY

Approaches presented herein enable cooperative traffic flow optimization. More specifically, a current position and route information for a plurality of vehicles traveling on a road segment are obtained. Common routes between the vehicles are determined and a first longest common route between two first vehicles is identified. A first vehicle chain navigation instruction based on the identified route is generated and sent to the two first vehicles, instructing the two vehicles to form a first vehicle chain. Further common routes are determined among the vehicles and the vehicle chain using the route information and a second longest common route is identified between a second vehicle and: another vehicle or the first vehicle chain. A second vehicle chain navigation instruction is generated instructing the second vehicle to form a second vehicle chain with the other vehicle or to join the first vehicle chain.

One aspect of the present invention includes a method for cooperative traffic flow optimization, the method comprising: obtaining a current position and route information for a plurality of vehicles traveling on a road segment; determining common routes between the plurality of vehicles using the route information; identifying a first longest common route between any two first vehicles of the plurality of vehicles; generating a first vehicle chain navigation instruction based on the two first vehicles having the longest common route, the first vehicle chain navigation instruction instructing the two first vehicles to form a first vehicle chain; and sending the first vehicle chain navigation instruction to the two first vehicles.

Another aspect of the present invention includes a computer system for cooperative traffic flow optimization, the computer system comprising: a memory medium comprising program instructions; a bus coupled to the memory medium; and a processor, for executing the program instructions, coupled to a chain navigation engine via the bus that when executing the program instructions causes the system to: obtain a current position and route information for a plurality of vehicles traveling on a road segment; determine common routes between the plurality of vehicles using the route information; identify a first longest common route between any two first vehicles of the plurality of vehicles; generate a first vehicle chain navigation instruction based on the two first vehicles having the longest common route, the first vehicle chain navigation instruction instructing the two first vehicles to form a first vehicle chain; and send the first vehicle chain navigation instruction to the two first vehicles.

Yet another aspect of the present invention includes a computer program product for cooperative traffic flow optimization, the computer program product comprising a computer readable hardware storage device, and program instructions stored on the computer readable hardware storage device, to: obtain a current position and route information for a plurality of vehicles traveling on a road segment; determine common routes between the plurality of vehicles using the route information; identify a first longest common route between any two first vehicles of the plurality of vehicles; generate a first vehicle chain navigation instruction based on the two first vehicles having the longest common route, the first vehicle chain navigation instruction instructing the two first vehicles to form a first vehicle chain; and send the first vehicle chain navigation instruction to the two first vehicles.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 4A shows an overhead view of a group of vehicles on a section of a highway of FIG. 3 according to illustrative embodiments, while

FIGS. 5A and 5B show an illustrative example of route information collected for the group of vehicles according to illustrative embodiments.

FIGS. 6A, 6B, and 6C show an illustrative example of an initial pass of a chain creation process according to illustrative embodiments.

FIGS. 7A, 7B, and 7C show an illustrative example of another pass of the chain creation process according to illustrative embodiments.

FIGS. 8A, 8B, and 8C show an illustrative example of yet another pass of the chain creation process according to illustrative embodiments.

FIGS. 9A, 9B, and 9C show an illustrative example of still yet another pass of the chain creation process according to illustrative embodiments.

FIGS. 10A, 10B, and 10C show an illustrative example of still another pass of the chain creation process according to illustrative embodiments.

FIGS. 11A, 11B, and 11C show an illustrative example of a final pass of the chain creation process according to illustrative embodiments.

Figure 1:
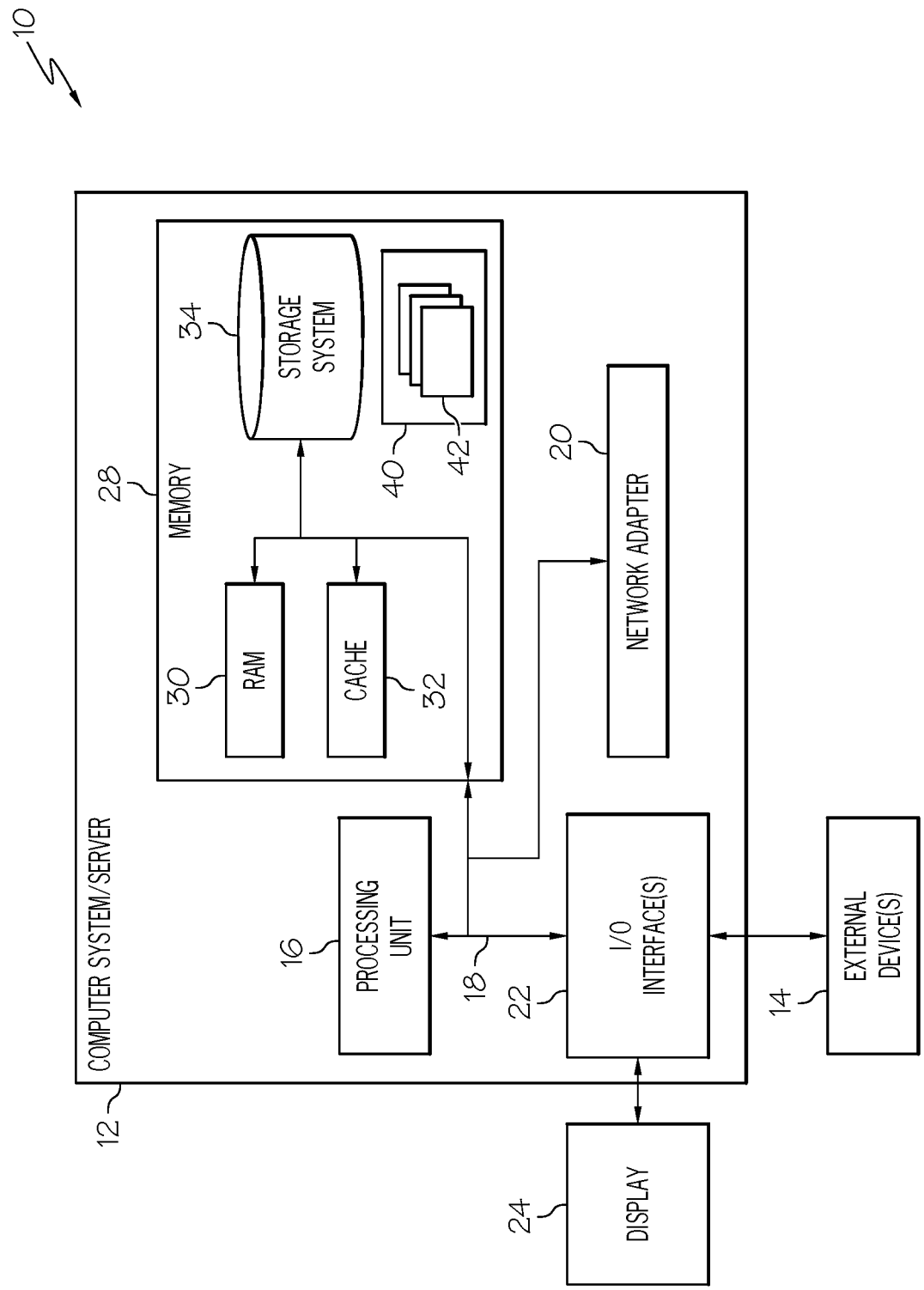
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide for cooperative traffic flow optimization. More specifically, a current position and route information for a plurality of vehicles traveling on a road segment are obtained. Common routes between the vehicles are determined and a first longest common route between two first vehicles is identified. A first vehicle chain navigation instruction based on the identified route is generated and sent to the two first vehicles, instructing the two vehicles to form a first vehicle chain. Further common routes are determined among the vehicles and the vehicle chain using the route information and a second longest common route is identified between a second vehicle and: another vehicle or the first vehicle chain. A second vehicle chain navigation instruction is generated instructing the second vehicle to form a second vehicle chain with the other vehicle or to join the first vehicle chain.

Referring now to FIG. 1, a computerized implementation 10 of an embodiment for cooperative traffic flow optimization will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for cooperative traffic flow optimization. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for cooperative traffic flow optimization, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that in a traffic flow with sufficient vehicles present, every vehicular movement comes with a cost. For example, changing lanes can cause a temporary slowdown both in the original lane, as a vehicle seeks a gap in a target lane, and in the target lane, as vehicles therein adjust to the lane-changing vehicle's arrival. In another example, merging onto a highway can cause a slowdown as the new vehicle comes up to speed with traffic, as well as causing slower vehicles from the merging lane to temporarily move into an otherwise faster lane to make room for the new vehicle. Furthermore, exiting a highway can cause similar conditions as merging: changing lanes to reach an exit lane and backing up traffic in a lane approaching the exit as people queue up to depart. As such, the drivers of vehicles may often find themselves jockeying for positions in an appropriate lane, as each driver attempts to achieve his or her disparate navigation goals.

Accordingly, the inventors of the present invention have developed an improvement to navigation systems that minimizes individualized jockeying movements between vehicles and therefore optimizes traffic flow, leading to smoother, less complicated vehicle navigation. Embodiments of the present invention achieve these improvements by grouping vehicles into chains based on similar routes. Each vehicle chain minimizes movement between vehicles in that chain and also facilitates the execution of movements in bulk.

Embodiments of the present invention offer several advantages for cooperative traffic flow optimization. For example, embodiments permit a navigation system to calculate a navigation route for a group of vehicles as a single block, instead of as individual vehicles, thus reducing and simplifying a load on the navigation system. Furthermore, embodiments can reduce extraneous loads on a navigation system, such as recalculating or calculating a new route for a vehicle because the vehicle driver was unable to get into a position to take an exit/turn as originally directed by the navigation system. Moreover, embodiments of the present invention permit a more efficient, less stressful, and safer driving experience for the drivers of vehicles, as well as their passengers. Furthermore, embodiments also offer the advantages of improved safety and reduced risk of accidents on the road. These advantages also include improved fuel economy for vehicles and less engine strain due to drafting/slipstreaming among vehicles in the same chain. The advantages further include reducing wear and tear on highways by minimizing lane changes, reducing high speeds, and decreasing occupation of all lanes of the highway by vehicles.

Figure 2:
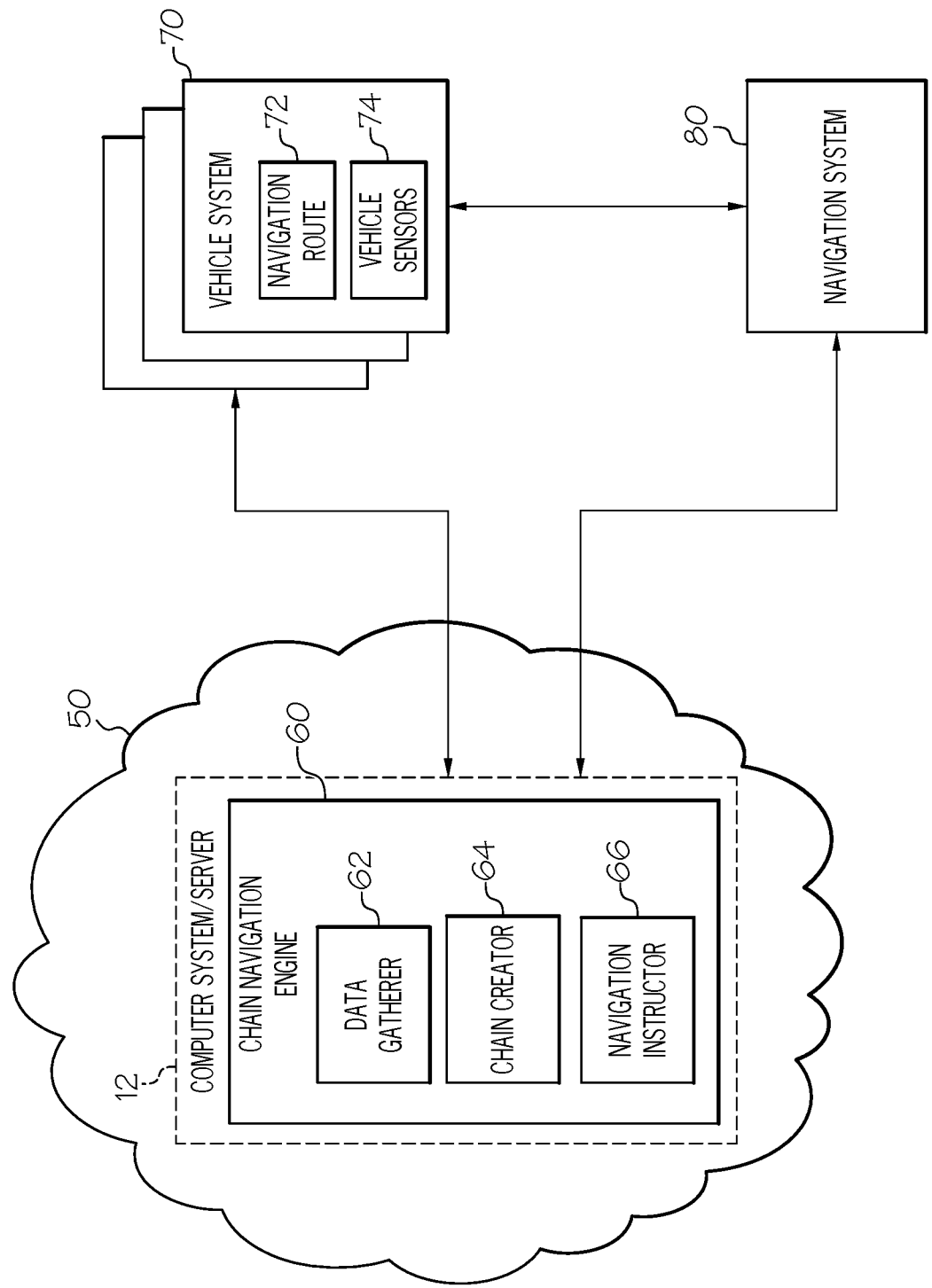
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have a chain navigation engine 60 (hereinafter "system 60"). Rather, all or part of system 60 could be loaded on a server or server-capable device that communicates (e.g., wirelessly) with the clients to provide for cooperative traffic flow optimization. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions similar to a general-purpose computer. Specifically, among other functions, system 60 can optimize traffic flow in a networked computing environment. To accomplish this, system 60 can include a set of components (e.g., program modules 42 of FIG. 1) for carrying out embodiments of the present invention. These components can include, but are not limited to, data gatherer 62 for obtaining a current position and route information for a plurality of vehicles traveling on a road segment; chain creator 64 for determining common routes between the plurality of vehicles using the route information and identifying longest common routes between vehicles; and navigation instructor 66 for generating vehicle chain navigation instructions based on the longest common routes, which instructs vehicles to form vehicle chains, and sending vehicle chain navigation instructions to vehicles.

Through computer system/server 12, system 60 can be in communication with vehicle computer systems 70 of a plurality of vehicles. In some embodiments, some vehicle computer systems 70 can be a computer integrated into the vehicle, such as an engine control unit/module (ECU/M), electronic engine management system (EEMS), or any computer having a user interface on a dashboard of the vehicle (e.g., a built-in navigation system). In still other embodiments, some vehicle computer systems 70 can be a mobile device that is temporarily associated with a vehicle, such as a smart phone, tablet, or navigation-specific device of the driver of the vehicle. In any case, vehicle computer system 70 can be configured to receive a navigation destination from a driver/operator of the vehicle and to provide navigation route information 72 to the driver via a user interface, such as a screen and/or audio speaker. To accomplish this, vehicle computer system 70 can be configured with an application or other computer software and communication means that permits vehicle computer system 70 to obtain navigation route information 72 from navigation system 80 (e.g., a global positioning system (GPS)).

Each vehicle's computer system 70 can also be in communication with and receive sensor data from one or more sensors 74 on, in, or around the vehicle. Vehicle sensors 74 can be configured to take various readings associated with a vehicle, such as speed, location, physical surroundings (including other vehicles), etc. Such sensors may include, but are not limited to, a camera, a proximity sensor, a speedometer, an accelerometer, a compass, a location sensor (e.g., based on a Global Positioning System (GPS)), etc. A camera of sensors 74 can be configured with object recognition software or otherwise have access to an object recognition system for recognizing and identifying objects in and around the vehicle. In some embodiments, sensors 74 can additionally or in the alternative include sensors that are not directly on, in, or around the vehicle, such as traffic cameras and other sensors monitoring a road/traffic environment.

Through computer system/server 12, system 60 can be in communication with navigation system 80. Navigation system 80 can be any navigation system that provides navigation directions to drivers of vehicles to assist in navigating the vehicles from first locations to second locations. Examples of such navigation systems include, but are not limited to, mobile device applications such as Google Maps, Apple Maps, and Waze, which are configured to provide users with a map having a marked route on a display screen of a mobile device and a set of auditory navigation instructions outputted by an audio speaker of the mobile device. (All trademarks and trade names used herein are the property of their respective owners and are used for illustrative and descriptive purposes only.) Generally, navigation system 80 can receive a target destination from a user/driver (e.g., through a smart phone application) and a current location of the user/driver (e.g., through a GPS enabled smart phone). Navigation system 80 can then, based on routing and map data, sometimes including real-time data, calculate a route that the user/driver can follow to travel from the current location to the target location. This route is typically relayed to the driver/user as a series of directions that reference, for example, streets and distances to be traveled, as well as transitions (e.g., turns) between such streets. It should be understood that navigation system 80 may be more than one navigation system configured to permit communication between more than one navigation application network. As such, navigation systems 80 may form an ad-hoc network of navigation systems or navigation system applications for the communication of information to and from system 60.

It should be understood that system 60, vehicle computer system 70, and navigation system 80 can be configured any number of ways relative to one another. For example, in some embodiments, system 60 can be configured to communicate with vehicle system 70 and navigation system 80 separately, while vehicle system 70 and navigation system 80 may or may not communicate with one another directly. In some other embodiments, system 60 can be configured to relay navigation information from navigation system 80 to vehicle system 70. In still other embodiments, system 60 can be configured to receive information from vehicle system 70 through navigation system 80 and to relay information back to vehicle system 70 through the same. In still other embodiments, system 60 can be a component of navigation system 80.

Figure 3:
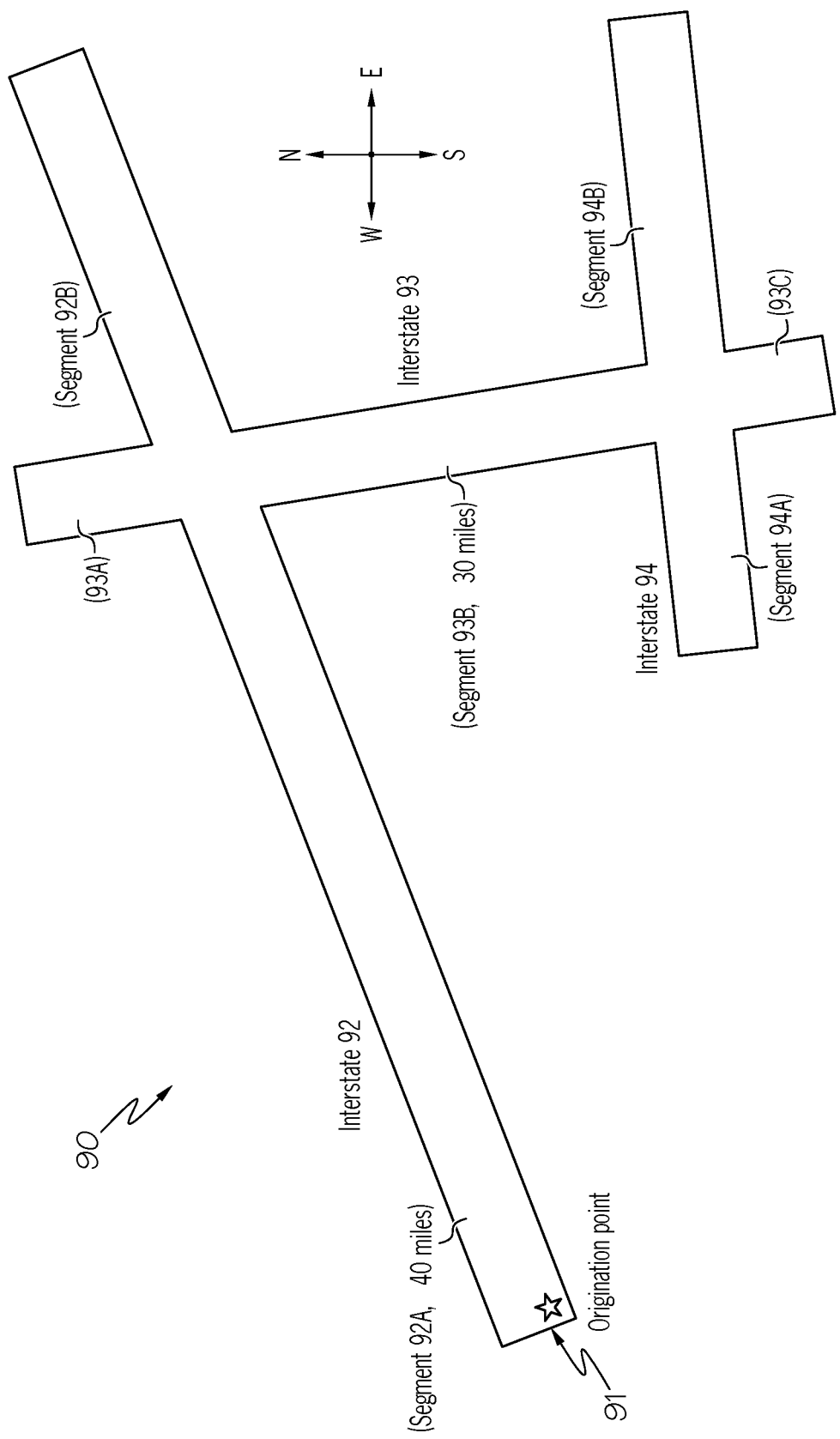
FIG. 3 shows a highway map of an illustrative example and, more specifically, segments of and intersections between interstates according to illustrative embodiments.
Figure 4A:
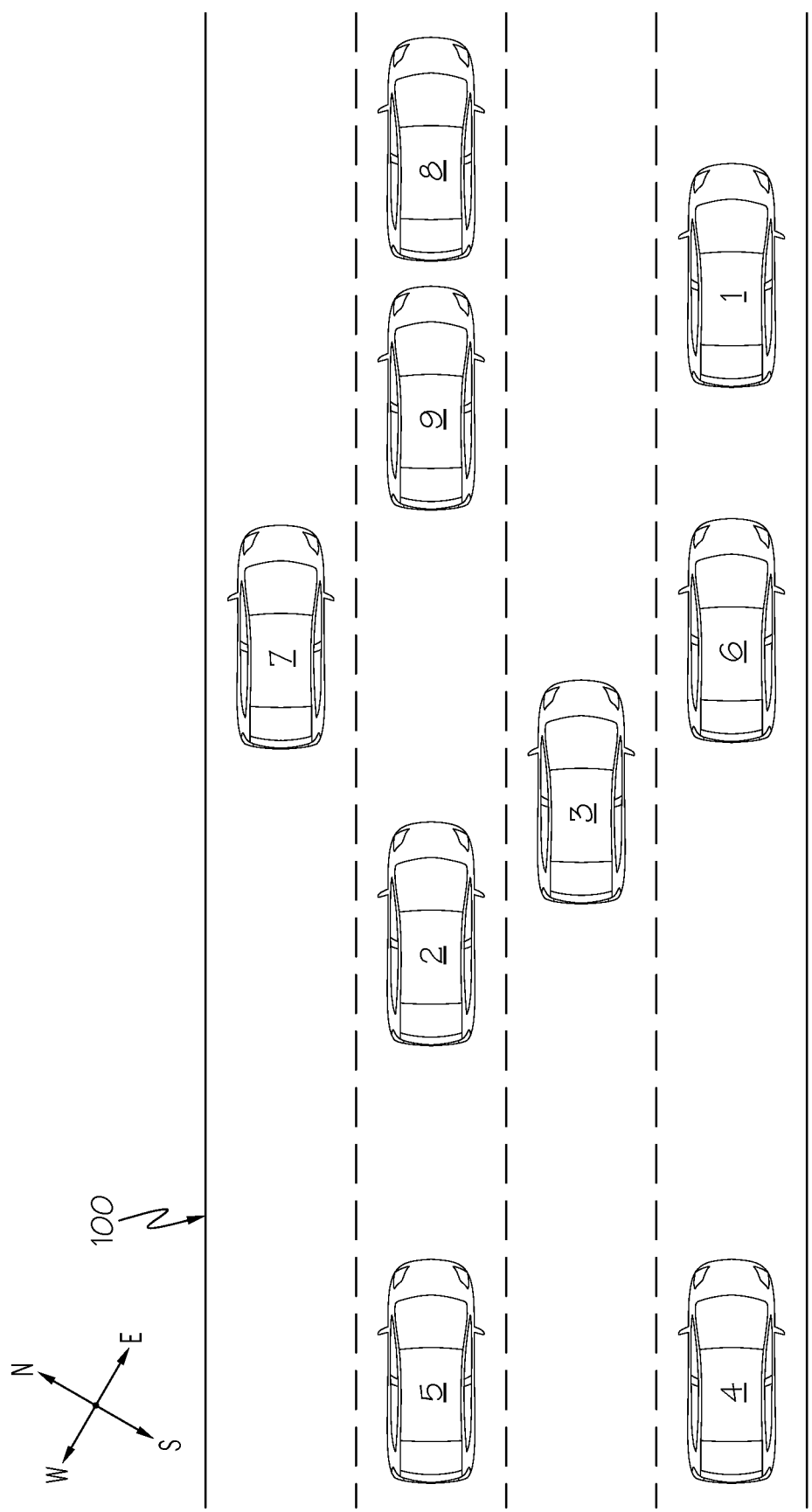

Referring now to FIG. 3 and FIG. 4A in connection with FIG. 2, embodiments of the present invention will be discussed with reference to an illustrative example. FIG. 3 shows highway map 90 of the illustrative example and, more specifically, shows segments of and intersections between Interstates 92, 93, and 94. FIG. 4A shows overhead view 100 of a group of vehicles 1 through 9 on an eastbound, four-lane section of Interstate 92 at about origin point 91 (FIG. 3). As can be seen in the illustrative example depicted in FIG. 4A, vehicles 1-9 are distributed fairly randomly across the lanes of Interstate 92 based on each individual driver of each individual vehicle 1-9 deciding where to place their respective vehicle on the roadway.

Data gatherer 62, as performed by computer system/server 12, obtains a current position and route information 72 for a plurality of vehicles (e.g., vehicles 1-9) traveling on a road segment (e.g., origin point 91 of interstate 94). Data gatherer 62 can be configured to retrieve this information from vehicle computer system 70 of each vehicle or from a more centralized navigation system 80, such as a database of a navigation application service. Data gatherer 62 can be configured to gather this information for a set of vehicles in a specific area (e.g., within a predetermined radius/distance from origin point 91). Alternatively or additionally, data gatherer 62 can be configured to gather this information more generally (e.g., for all vehicles using a particular navigation application) for later allotment based on vehicle location.

The information gathered by data gatherer 62 can include, but is not limited to, a current location of a vehicle, movements of the vehicle, and identifying information about the vehicle and/or other vehicles around the vehicle. The current location can include GPS coordinates of the vehicle, a position of the vehicle along a roadway (e.g., relative to mile makers), a position of the vehicle on the roadway (e.g., a lane position), etc. The movements of the vehicle can include a heading/direction of the vehicle, a speed/velocity of the vehicle, lane changes of the vehicle, etc. The identifying information about the vehicle can include, for example, a plate number or vehicle identification number (VIN), a make and/or model of the vehicle, and/or a type and/or color of the vehicle (e.g., blue sedan, red hatchback) that vehicle computer system 70 is configured to provide. The identifying information about other vehicles around the vehicle can be derived from sensors 74 in, on, or around the vehicle or from the other vehicle themselves.

As earlier stated, data gatherer 62 can obtain route information 72 for each of a group of vehicles. This route information 72 can include a destination, a set of navigation directions, a list of roads to be traveled, segments and/or distances to be traveled on each road, exits/entrances, turns, etc. In some embodiments, route information 72 can also include information about road conditions, such as average speeds or speed limits on particular roads, or alternative route information in the case that a main route becomes undesirable to travel. Continuing the example shown in FIG. 3 and FIG. 4B, an illustrative example of route information 72 collected by data gatherer 62 for vehicles 1 through 9 is shown in FIG. 5A. For instance, as shown in FIG. 5A, vehicle 6 is currently at origin point 91 (FIG. 3) and the operator of vehicle 6 is following route instructions that will cause vehicle 6 to travel 40 miles along segment 92A of Interstate 92, then turn on to Interstate 93 for 30 miles along segment 93B, and then continue 100 miles along segment 93C of Interstate 93.

Referring now to FIG. 5B, chain creator 64, as performed by computer system/server 12, determines common routes between a plurality of vehicles (e.g., vehicles 1-9) using route information 72. Chain creator 64 accomplishes this by comparing the routes to be traveled by each of the vehicles and determining which portions of each route each vehicle has in common with the other vehicles. Chain creator 64 determines the length (e.g., in miles or kilometers) of these in common portions. Chain creator 64 can generate a table or data structure similar to the chart shown in FIG. 5B to store each length of the common portions of the routes. For example, continuing the illustrative example, chain creator 64 determines that vehicle 6 shares 40 miles of segment 92A of Interstate 92 with vehicles 1-5 and 7-9, while sharing an additional 30 miles along segment 93B of Interstate 93 with vehicles 2, 4, 5, 8, and 9 (for a total of 70 miles), and an additional 50 miles along segment 93C of Interstate 93 with vehicle 2 (for a total of 120 miles).

In some embodiments, chain creator 64 can be configured to determine groups of vehicles that should be considered for potential chaining together. Chain creator 64 can be configured to form chains among a group of vehicles within a predetermined distance from one another. For example, chain creator 64 can determine that because vehicles 1-9 are within the same quarter mile portion of Interstate 92, they should be examined together for potential chaining. Additionally or in the alternative, chain creator 64 can be configured to chain vehicles that are arriving at a particular point along a road. For example, if the traffic near origin point 91 is particularly heavy during rush hours, chain creator 64 can be configured to create vehicle chains for vehicles 1-9 entering that area at that time.

In some further embodiments, chain creator 64 can be configured to identify some vehicles that should remain unchained or otherwise excluded from the vehicle chaining. Vehicles with operators whose driving behavior would cause them to be unable to drive in a vehicle chain may be excluded from being considered for chaining. For example, chain creator 64 can exclude the vehicles of drivers whose speeds are above or below an average speed on the roadway by a threshold amount (e.g., a standard deviation). Likewise, if a driver's driving style is aggressive or abrupt (e.g., as compared with a standard safe driver profile), they may be unlikely to cooperate with vehicle chaining and therefore should be excluded. Some vehicles can also be assigned a higher priority to exclude them from chaining. For example, chain creator 64 can keep police, ambulance, and other emergency vehicles, even if the vehicle is not at the moment in emergency mode, out of the pool of vehicles to be chained.

Referring now to FIGS. 6A, 6B, and 6C, an illustrative example of an initial pass of a chain creation process is shown. Chain creator 64, as performed by computer system/server 12, can identify a first longest common route between any two first vehicles of a plurality of vehicles. Chain creator 64 can accomplish this by searching the previously generated table or similar data structure that stores each length of the common portions of the routes of the vehicles to be chained. In the illustrative example, chain creator 64 can identify, as shown in FIG. 6B, the 170 miles of navigation routes that vehicle 8 and vehicle 9 share as the first longest common route. This first longest common route is formed from the 40 miles on segment 92A of interstate 92, the 30 miles on segment 93B of interstate 93, and the 100 miles on segment 94A of interstate 94 that overlap in the navigation information 72 obtained for vehicles 8 and 9. Chain creator 64 can create a first chain 101, as shown in FIG. 6C, 1 that includes vehicles 8 and 9. In some embodiments, chain creator 64 can create an indicator, such as a marker to tag, as shown in FIG. 6A, that indicates that vehicles 8 and 9 have been assigned to a chain. This indicator can be used to determine that any subsequent vehicle having a longest common route with vehicles 8 and/or 9 should be added to chain 101, as this chain already includes vehicles 8 and 9. This permits chain 101 to essentially replace/overlay vehicles 8 and 9 in the pool of vehicles to be chained.

Navigation instructor 66, as performed by computer system/server 12, can generate a first vehicle chain navigation instruction based on the two first vehicles having the longest common route. This first vehicle chain navigation instruction instructs the drivers of the two first vehicles to form a first vehicle chain. According to some embodiments, the vehicle chain navigation instruction can be a navigation instruction similar to those delivered to the vehicles by navigation system 80, that is to say, an instruction in a human-understandable language that informs a driver of a vehicle to take a particular action. (It should be understood that in some other embodiments, the vehicle chain navigation instruction need not be an instruction in a human-understandable language, but, rather, may be in a machine-readable language.) Whereas a traditional navigation system 80 may produce instructions such as "Turn right on Main Street," the vehicle chain navigation instruction may inform a driver to "Change lanes to the right and follow the blue car." Navigation instructor 66 can use the identifying information gathered by data gatherer 62 about a particular vehicle and other vehicles around the vehicle (e.g., plate number of vehicle, make and/or model of vehicle, type and/or color of vehicle) as points of reference in the vehicle chain navigation instruction (e.g., "Follow the green truck"). In the illustrative example, navigation instructor 66 can produce the following vehicle chain navigation instruction for vehicle 9, "Move two lanes over to the right-hand lane," and the following vehicle chain navigation instruction for vehicle 8, "Move two lanes over to the right-hand lane, behind the blue car (vehicle 9)."

In some embodiments, navigation instructor 66 can also determine and provide a recommended entry speed for a vehicle as it forms a chain (or enters an existing chain). To accomplish this, navigation instructor 66 can review a speed collected by data gatherer 62 of the vehicle and of any other vehicles that will be (or are already) in the chain. Navigation instructor 66 can determine an entry speed to recommend to the vehicle based on the speed of any other vehicle forming (or already in) the chain, an average speed of the vehicles forming (or already in) the chain, or an average speed of both the vehicle itself and the other vehicles forming (or already in) the chain. Navigation instructor 66 can include this speed recommendation to the driver of the vehicle as part of the vehicle chain navigation instruction. For example, in the illustrative example, navigation instructor 66 can produce the following vehicle chain navigation instruction for vehicle 8, "Slow to 65 miles per hour and move two lanes over to the right-hand lane, behind the blue car (vehicle 9)." In some embodiments, navigation instructor 66 can configure vehicle chain navigation instruction to deliver a vehicle speed instruction to the engine control unit/module (ECU/M), electronic engine management system (EEMS), or any other vehicle computer system 70 configured to control a speed of the vehicle through a cruise-control feature. This vehicle speed instruction can be configured to automatically adjust a cruising speed of the vehicle to the recommended entry speed, in the case that the cruise control feature is currently being employed in the vehicle. Navigation instructor 66 can also be configured to direct the driver of the vehicle to alter their speed periodically, depending on road conditions, vehicles entering/leaving the chain, speed changes in other vehicles in the chain, etc. Navigation instructor 66 can be configured to periodically review the data dynamically gathered by data gatherer 62 for indications that vehicle speed should be altered.

Navigation instructor 66, as performed by computer system/server 12, can send the first vehicle chain navigation instruction to the two first vehicles. In some embodiments, the first vehicle chain navigation instruction can be sent to the two first vehicles corresponding with the instruction substantially as soon as chain creator 64 determines that the two first vehicles should form the first vehicle chain and navigation instructor 66 generates the navigation instructions to do so. Navigation instructor 66 can send the vehicle chain navigation instruction directly to vehicle computer system 70 or to navigation system 80, which in turn can send the vehicle chain navigation instruction to vehicle system 70. In any case, the vehicle chain navigation instruction can be integrated into navigation instructions 72 for delivery to the driver of the vehicle. In some embodiments, navigation instructor 66 can be configured to hold all vehicle chain navigation instructions until all vehicles in the pool of vehicles to be chained have been assigned a vehicle chain. This embodiment enables the flexibility to switch or swap a vehicle from one chain to another if desired or necessary (e.g., in order to keep chains at a particular length). This embodiment would further permit all vehicles to receive the instruction to form chains at relatively the same time, enabling cooperation between vehicle drivers as they maneuver their vehicles into the chain. In any case, in the illustrative example, vehicles 8 and 9 are assigned to vehicle chain 101 and can be sent an instruction to form chain 101, as shown in overhead view 110 of FIG. 4B.

Referring now to FIGS. 7A, 7B, and 7C, an illustrative example of another pass of the chain creation process is shown. In this and each subsequent iteration of the chain creation process, chain creator 64 can be configured to follow a set of rules to determine whether each vehicle should be added to an existing chain, become part of a new chain, or be left unchained. Chain creator 64 is configured to identify the remaining longest common route between any remaining (i.e., unchained) two vehicles or any remaining (i.e., unchained) vehicle and an existing chain. If a pair of vehicles with the remaining longest route shares a route that contains the same segments as an existing chain, then chain creator 64 adds the pair of vehicles to that chain. But, if the pair of vehicles with the remaining longest route shares a route that does not contain the same segments as an existing chain, then chain creator 64 forms a new chain with the pair of vehicles. If there is no longest common route between two remaining vehicles, but there is a longest common route between a remaining single vehicle and a chain (or a vehicle already in the chain), chain creator 64 adds that vehicle to that chain. If there is only one vehicle remaining, chain creator 64 can add that vehicle to any chain in which there is a chained vehicle with an overlapping route. Finally, if a vehicle has no routes overlapping with any other vehicle or chain, chain creator 64 leaves that vehicle unchanged. The chain creation process reiterates until all vehicles of the plurality of vehicles have been chained or have been noted as unchainable. These rules will be described in more detail below with reference to the illustrative example.

Referring again to FIGS. 7A, 7B, and 7C, chain creator 64, as performed by computer system/server 12, determines the remaining common routes among the plurality of vehicles and the first vehicle chain using the route information, as shown in FIG. 7B. This can be accomplished by updating the previously generated table or similar data structure that stores each length of the common portions of the routes of the vehicles to be chained to ignore the already identified first longest common route, and comparing all other routes. Chain creator 64, as performed by computer system/server 12, can identify a second longest common route between a second vehicle and one of the following: another vehicle of the plurality of vehicles or the first vehicle chain. Chain creator 64 can accomplish this by searching the updated table or similar data structure that stores each length of the common portions of the routes of the vehicles to be chained for the longest remaining common route. In the illustrative example, chain creator 64 can identify, as shown in FIG. 7B, the 120 miles of navigation routes that vehicle 2 and vehicle 6 share as the second longest common route. This second longest common route is formed from the 40 miles on segment 92A of interstate 92, the 30 miles on segment 93B of interstate 93, and the 50 miles on segment 93C of interstate 93 that overlap in the navigation information 72 obtained for vehicles 2 and 6. As this second longest common route does not contain the same segments as existing chain 101, chain creator 64 can create a second chain 102, as shown in FIG. 7C, that includes vehicles 2 and 6. In some embodiments, chain creator 64 can also create an indicator, as shown in FIG. 7A, that indicates that vehicles 2 and 6, as above with like vehicles 8 and 9, have been assigned to a chain.

Navigation instructor 66, as performed by computer system/server 12, can generate, in the case that the identified second longest common route is between a vehicle and another vehicle of the plurality of vehicles, a second vehicle chain navigation instruction. This second vehicle chain navigation instruction instructs the drivers of these second two vehicles to form a second vehicle chain. As described above with respect to the first vehicle chain navigation instruction, the second vehicle chain navigation instruction is an instruction in a human-understandable language (or machine-readable language) that informs a driver of a vehicle to take a particular action. In the illustrative example, navigation instructor 66 can produce the following vehicle chain navigation instruction for the driver of vehicle 6, "Move two lanes over to the left, middle lane," and the following vehicle chain navigation instruction for the driver of vehicle 2, "Remain in your lane and permit the white hatchback (vehicle 6) to merge in front of you." This vehicle chain navigation instruction can also include a recommended entry speed for the drivers of vehicles 2 or 6 as they form the second vehicle chain. Navigation instructor 66, as performed by computer system/server 12, can send the second vehicle chain navigation instruction to the two second vehicles, as described above with respect to the first vehicle chain navigation instruction. In the illustrative example, vehicles 2 and 6 are assigned to vehicle chain 102 and can be sent an instruction to form chain 102, as shown in overhead view 110 of FIG. 4B.

It should be noted that, in some embodiments of the invention, the order of the vehicles in each chain can be set by creator 64 and/or navigation instructor 66 based on any number of factors. Such vehicle order factors can include the distance for which the vehicle will be in the chain or a speed of the vehicle relative to the speeds of other vehicles in the chain. A vehicle that is going to leave the chain sooner than other vehicles in the chain may be placed at the front or the tail of the chain in order to make this departure smoother. For example, in the illustrative example, vehicle 2 is placed behind vehicle 6 because vehicle 2 will leave the chain after 50 miles on segment 93C of Interstate 93, while vehicle 6 will continue on Interstate 93 for an additional 50 miles after that. Similarly, a vehicle that is going slightly faster than another vehicle in the chain may be placed further ahead in the chain to mitigate undesirable driving practices, such as tailgating. For example, in the illustrative example, vehicle 9 may be placed in front of vehicle 8 because vehicle 9 is presently moving at 1 mph faster than vehicle 8. Other techniques and rules for ordering the vehicles of a chain can also be used.

It should also be noted that, in some embodiments of the invention, the assignment of each chain to a particular lane by creator 64 and/or navigation instructor 66 can be based on any number of factors. Such lane assignment factors can include the distance that the chain will be on the road, a nearness of the next exit/entrance ramp or turn that the chain must take, an average speed of the chain, or a length of a chain. For example, chains with more distance to travel may be moved to less active lanes, while chains with an upcoming ramp or turn may be placed in a lane closest to that ramp or turn. Likewise, a faster moving chain may be guided to a faster moving lane, such as a carpool lane, while a longer, slower moving chain may be placed in a lane designated for slower moving traffic.

Referring now to FIGS. 8A, 8B, and 8C, an illustrative example of yet another pass of the chain creation process is shown. As described above with respect to FIG. 7B, chain creator 64 determines the remaining common routes among the plurality of vehicles and vehicle chains using the route information, as shown in FIG. 8B, and identifies a next longest common route between a vehicle and one of the following: another vehicle of the plurality of vehicles or an existing vehicle chain. In the illustrative example, chain creator 64 can identify, as shown in FIG. 8B, the 120 miles of navigation routes that vehicle 5 shares with vehicles 8 and 9 (chain 101) as the next longest common route. This next longest common route is formed from the 40 miles on segment 92A of interstate 92, the 30 miles on segment 93B of interstate 93, and the 50 miles on segment 94A of interstate 94 that overlap in the navigation information 72 obtained for vehicles 5, 8, and 9. As this route is a longest common route between a remaining single vehicle and a chain (or a vehicle already in the chain), chain creator 64 adds vehicle 5 to chain 101, as shown in FIG. 8C. Chain creator 64 can also create an indicator, as shown in FIG. 8A, which indicates that vehicle 5 has been assigned to a chain. In some embodiments, chain creator 64 can be configured to add vehicles to chains and/or create new chains in parallel when one or more vehicle-chain pairs and/or one or more vehicle-vehicle pairs have the same longest common lengths. As such, in the illustrative example, chain creator 64 can add vehicle 5 to chain 101 substantially in parallel with the creation of chain 102 from vehicles 2 and 6.

In any case, navigation instructor 66, as performed by computer system/server 12, can generate, in the case that the identified second longest common route is between a vehicle and the first vehicle chain, a first vehicle chain addition navigation instruction. This first vehicle chain addition navigation instruction instructs the driver of the second vehicle to join the first vehicle chain. In the illustrative example, navigation instructor 66 can produce the following first vehicle chain addition navigation instruction for the driver of vehicle 5, "Move two lanes over to the right-hand lane, behind the red sports car (vehicle 8)." This vehicle chain navigation instruction can also include a recommended entry speed for the driver of vehicle 5 when entering chain 101 based on the speed of vehicle 8 or 9 already in chain 101, an average speed of vehicles 8 and 9 already in chain 101, or an average speed of vehicles 8, 9, and 5 together (in which case the drivers of vehicles 8 and 9 may also receive instructions to alter their speeds). For example, in the illustrative example, navigation instructor 66 can produce the following vehicle chain navigation instruction for vehicle 5, "Speed up to 65 miles per hours and move two lanes over to the right-hand lane, behind the red sports car (vehicle 8)." Navigation instructor 66, as performed by computer system/server 12, can send the first vehicle chain addition navigation instruction to the vehicle being added to the vehicle chain as described above with respect to the first vehicle chain navigation instruction. In the illustrative example, vehicle 5 is assigned to vehicle chain 101 and can be sent an instruction to enter chain 101, as shown in overhead view 110 of FIG. 4B.

Referring now to FIGS. 9A, 9B, and 9C, an illustrative example of still yet another pass of the chain creation process is shown. In the illustrative example, chain creator 64 can identify, as shown in FIG. 9B, the 90 miles of navigation routes that vehicle 1 and vehicle 7 share as the next longest common route. This next longest common route is formed from the 40 miles on segment 92A of interstate 92 and the 50 miles on segment 92B of interstate 92 that overlap in the navigation information 72 obtained for vehicles 1 and 7. As this next longest common route does not contain the same segments as existing chain 101 or chain 102, chain creator 64 can create a third chain 103, as shown in FIG. 9C, that includes vehicles 1 and 7. Chain creator 64 can also create an indicator, as shown in FIG. 9A, which indicates that vehicles 1 and 7 have been assigned to a chain. In the illustrative example, navigation instructor 66 can produce the following third vehicle chain navigation instruction for the driver of vehicle 7, "Move to the right one lane," and the following third vehicle chain navigation instruction for the driver of vehicle 1, "Move two lanes to the left, between the black RV (vehicle 7) and the white hatchback (vehicle 6)." Navigation instructor 66, as performed by computer system/server 12, can send the third vehicle chain navigation instructions to vehicles 1 and 7. As such, in the illustrative example, vehicles 1 and 7 are assigned to vehicle chain 103 and can be sent an instruction to form chain 103, as shown in overhead view 110 of FIG. 4B.

Referring now to FIGS. 10A, 10B, and 10C, an illustrative example of still another pass of the chain creation process is shown. In the illustrative example, chain creator 64 can identify, as shown in FIG. 10B, the 70 miles of navigation routes that vehicle 4 shares with the vehicles of chain 101 or the vehicles of chain 102 as the next longest common route. In either case, this next longest common route is formed from the 40 miles on segment 92A of interstate 92 and the 30 miles on segment 93B of interstate 93 that overlap in the navigation information 72 obtained for vehicle 4 and vehicles 2, 6, 5, 8, and 9. As this route is a longest common route between a remaining single vehicle and a chain (or a vehicle already in the chain), chain creator 64 can add vehicle 4 to chain 101 or to chain 102.

Chain creator 64 can determine which of chains 101 or 102 to add vehicle 4 to using any number of decision factors. These factors can include, but are not limited to, the length of existing candidate chains (e.g., it may be desirable to limit chains to a certain length, to maximize a chain length, or to distribute vehicles across chains as evenly as possible/reasonable in light of the chain assignment rules), the chains' lane positions on the highway relative to how soon the vehicle will be departing the chain (e.g., it may be desirable to insert the vehicle into a chain in a lane next to an upcoming ramp or turn for the vehicle), the average speeds of the chains (e.g., it may be desirable to add the vehicle to the chain whose speed is closest to that of the vehicle), round-robin assignment, or random assignment. In the illustrative example, chain creator 64 adds vehicle 4 to chain 101 based on random assignment.

In any case, chain creator 64 can also create an indicator, as shown in FIG. 10A, which indicates that vehicle 4 has been assigned to a chain. In the illustrative example, navigation instructor 66 can produce the following second vehicle chain addition navigation instruction for the driver of vehicle 4, "Permit the green truck (vehicle 5) to merge in front of you." Navigation instructor 66, as performed by computer system/server 12, can send the second vehicle chain addition navigation instruction to vehicle 4. As such, in the illustrative example, vehicle 4 is assigned to vehicle chain 101 and can be sent an instruction to join chain 101, as shown in overhead view 110 of FIG. 4B.

Referring now to FIGS. 11A, 11B, and 11C, an illustrative example of a final pass of the chain creation process is shown. In the illustrative example, chain creator 64 can identify, as shown in FIG. 11B, the 40 miles of navigation route along segment 92A of Interstate 92 that vehicle 3 shares with all vehicles of chains 101, 102, or 103 as the remaining longest common route. As the distance of the overlapping route between vehicle 3 and each of the chains is the same, chain creator 64 can add vehicle 3 to any of chain 101, chain 102, or chain 103. Chain creator 64 can determine which of chains 101, 102, or 103 to add vehicle 3 to using any of the decision factors discussed above with reference to vehicle 4, or any other factors. In the illustrative example, chain creator 64 adds vehicle 3 to chain 102 to distribute the chains' lengths. Chain creator 64 can also create an indicator, as shown in FIG. 11A, which indicates that vehicle 3 has been assigned to a chain. In the illustrative example, navigation instructor 66 can produce the following third vehicle chain addition navigation instruction for the driver of vehicle 3, "Move a lane to the left, behind the gray sedan (vehicle 2)." Navigation instructor 66, as performed by computer system/server 12, can send the third vehicle chain addition navigation instruction to vehicle 3. As such, in the illustrative example, vehicle 3 is assigned to vehicle chain 102 and can be sent an instruction to join chain 102, as shown in overhead view 110 of FIG. 4B.

In some embodiments, chain creator 64 and/or navigation instructor 66 can adjust which vehicles are in each chain to achieve a particular goal, such as vehicle chains of substantially equal length. For instance, in the illustrative example, chain creator 64 and/or navigation instructor 66 could transfer vehicle 4 to chain 102, as vehicle 4 shares the same common route with chains 101 and 102, and could transfer vehicle 3 to chain 103, as vehicle 3 shares the same common route with chains 102 and 103, resulting in three chains of equal length, having three vehicles each.

Figure 4B:
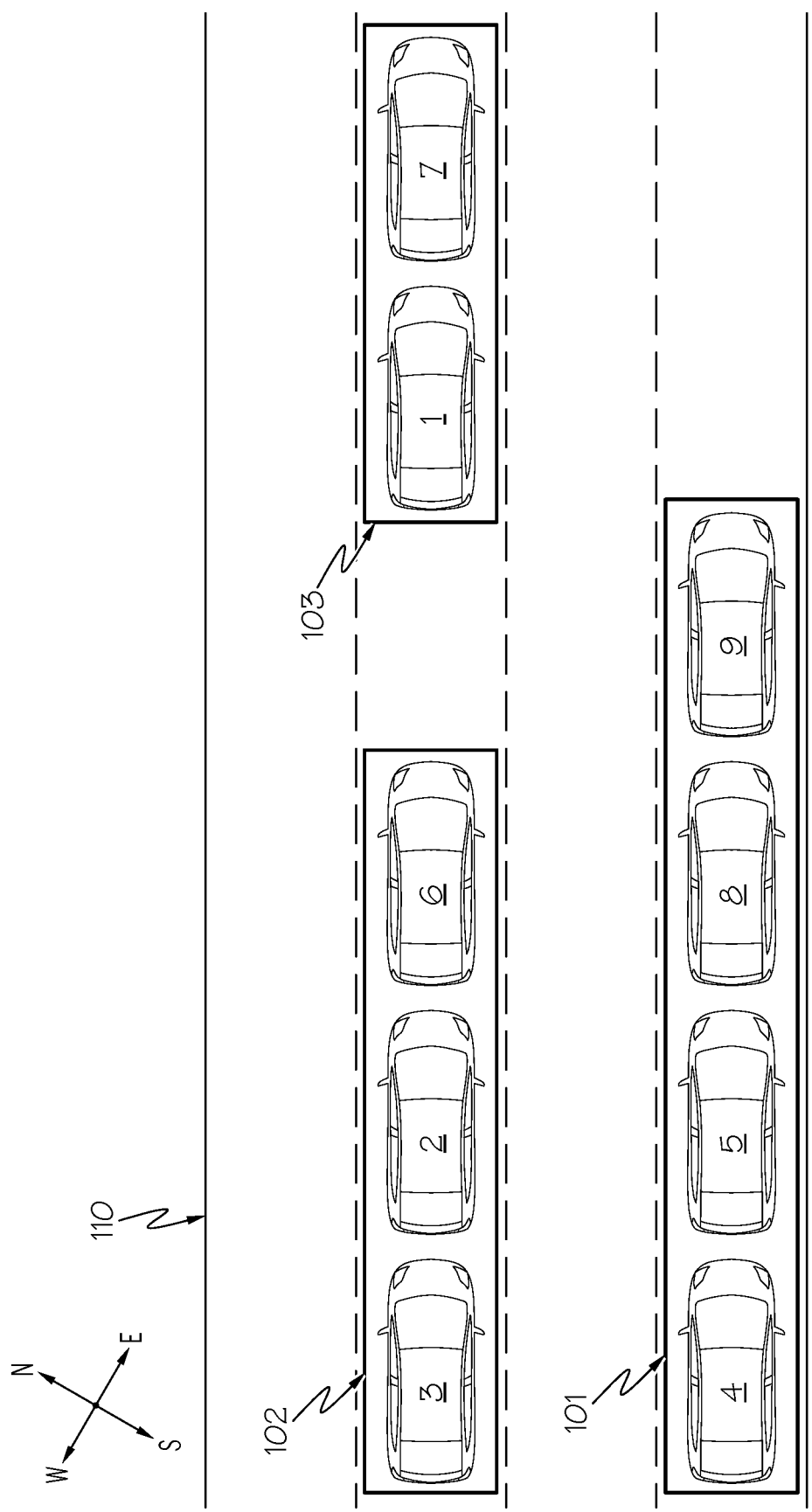
FIG. 4B shows an overhead view of the same section of highway as FIG. 4A, but with the vehicles divided into navigation chains, according to illustrative embodiments.

Regardless, referring now to FIG. 4B, an illustrative example of a set of vehicle chains created by the chain creation process is shown. As discussed above, navigation instructor 66 can vehicle chain navigation instructions and vehicle chain addition navigation instructions to the vehicles that will chain creator 64 has determined will form the vehicle chains. Navigation instructor 66 can send these instructions in real time for each vehicle, as chain creator 64 assigns that vehicle to a chain, or navigation instructor 66 can send these instructions to each of the vehicles once chain creator 64 has finished assigning each vehicle to a vehicle chain. Navigation instructor 66 can send the instructions directly to vehicle computer system 70 or to navigation system 80 using any communications network and network hardware presently known or later developed. Navigation instructor 66 can direct vehicle computer system 70 or navigation system 80 to insert the vehicle chain and vehicle addition navigation instructions into navigation instructions 72 for delivery to the driver of each vehicle. In some embodiments, vehicle chain and vehicle addition navigation instructions can supplement or replace portions of navigation instructions 72. For example, the navigation instruction "Turn left, then right" could be replaced with the vehicle chain navigation instruction "Follow the blue car until you are directed otherwise." This means that only a driver of a lead vehicle (e.g., vehicles 7, 6, and 9) need be told original navigation instructions 72 for the duration of the chain's life, while all drivers of vehicles following the lead vehicle need only be told to follow the vehicle in front of them until directed otherwise. For instance, in the illustrative example, the driver of lead vehicle 9 of chain 101 will be provided with navigation instructions 72 from navigation system 80, instructing the driver of vehicle 9 to exit Interstate 92 for Interstate 93 South, and, after 30 miles, to exit Interstate 93 for Interstate 94 West. The vehicle chain navigation instructions, however, will cause the driver of vehicle 8 to only be told to follow the blue car (vehicle 9), will cause the driver of vehicle 5 to only be told to follow the red sports car (vehicle 8), and will cause the driver of vehicle 4 to only be told to follow the green truck (vehicle 5).

In some embodiments, vehicle chain and vehicle chain addition navigation instructions can also include an instruction for leaving the vehicle chain and/or for resuming navigation instructions 72 originally provided to vehicle computer system 70 by navigation system 80. For instance, in the illustrative example, as the rest of chain 101 is exiting Interstate 93 for segment 94A of Interstate 94, the vehicle chain addition navigation instruction sent to vehicle 4 by navigation instructor 66 can tell the driver of vehicle 4 to "Stop following the green truck (vehicle 5) and take the upcoming exit to Interstate 94 East." After this, the vehicle chain addition navigation instruction can cause vehicle computer system 70 of vehicle 4 to resume informing the driver of vehicle 4 of navigation instructions 72.

Furthermore, in some embodiments, vehicle chain and vehicle chain addition navigation instructions or additional instructions received from navigation instructor 66 can advise a driver of the exiting vehicle of an exit speed for leaving the vehicle chain. This exit speed may be, for example, a speed or average speed of one or more vehicles in traffic surrounding the vehicle chain, a speed limit, an exit speed limit, a recommended turning speed, etc. The exit speed direction can be configured for delivery through a human-understandable medium (e.g., a navigation system announcement) or to any vehicle computer system 70 configured to control a speed of the vehicle through a cruise-control feature. In the latter case, this exit speed instruction can be configured to automatically adjust a cruising speed of the vehicle to the recommended exit speed, in the case that the cruise control feature is currently being employed in the vehicle.

In the illustrative example shown in FIG. 4B, once the drivers of vehicles 1-9 receive and follow their vehicle chain and vehicle chain addition navigation instructions, vehicles 9, 8, 5, and 4 are chained together as chain 101; vehicles 6, 2, and 3 are chained together as chain 102; and vehicles 1 and 7 are chained together as chain 103. In this example, the vehicles of chain 101 will travel together, unified as one chain, with no vehicles departing for 120 miles (40 miles on Interstate 92, 30 miles on Interstate 93, and then 50 miles on Interstate 94, after which vehicles 4 and 5 will detach from chain 101 and exit.) Similarly, Chain 102 will remain intact for 90 miles, and Chain 103 for 40 miles. Although in the illustrative example shown in FIG. 4B two lanes on Interstate 92 have been left open for travel by other vehicles (such as emergency vehicles), with chain 101 in the right-hand lane and chains 102 and 103 in the left, middle lane, this need not be the case in all embodiments. In some embodiments, the chains can also be conglomerated into a longer, one-lane train of multiple chains, or each assigned to a separate lane. As can be seen in overhead view 110, chains 101-103 organize vehicles 1-9 logically and minimize lane-to-lane movement, hence decreasing traffic congestion.

It should also be understood that, in some embodiments, when a vehicle leaves (e.g., takes an exit or turn different than the main body of the chain) its assigned chain (i.e., the route the vehicle had in common with the other vehicles of the chain has ended), that vehicle can remain independent, or chain navigation engine 60 (hereinafter "system 60") can assign the vehicle to a new chain (e.g., at the point of departure from the old chain). For example, with reference to the illustrative example, when vehicle 4 turns to the east onto segment 94B of Interstate 94, while the rest of chain 101 turns west onto segment 94A of Interstate 94, system 60 can add vehicle 4 to an existing or newly created vehicle chain also heading east on Interstate 94. Furthermore, in some embodiments, system 60 can join established chains or remaining fragments of existing chains to other vehicles or other established chains or remaining fragments of existing chains. For example, system 60 can join the reminder of chain 101 (vehicles 5, 8, and 9) heading west on segment 94A with another chain also heading west on segment 94A. To accomplish this, system 60 can be configured to, from time to time (e.g., periodically or when a vehicle leaves a chain), repeat the chain creation process described herein to update existing chains, join or break some chains, and establish new chains.

Although embodiments of the present invention have been described herein with respect to a group of vehicles each operated by a driver following a set of navigation instructions, in some embodiments, one or more of these vehicles can be an autonomous vehicle, operated by a computer system instead of a human driver. As such, as used in the detailed description above, it should be understood that the term "driver" can refer to a human driver or to a computer system configured to drive and operate a vehicle. Such computer-driven vehicles may be fully autonomous, requiring no input from a human being, while other such vehicles may be partially autonomous, permitting a human driver to perform some driving tasks aided by the computer system.

Furthermore, although embodiments of the present invention have been primarily described herein with respect to forming chains among a group of vehicles, embodiments of the present invention can also be applied to any physical, logical, or abstract objects which are routed along a set of initially overlaying paths that eventually diverge. The vehicle chaining process herein described can also be used to identify longest common routes among any type of units and then create routing instructions to route sub-groups of the units as chains of units. For example, the chain formation process of the present invention could be applied to items ranging from luggage moving through an airport using an automated system to data packets traversing a network.

Figure 12:
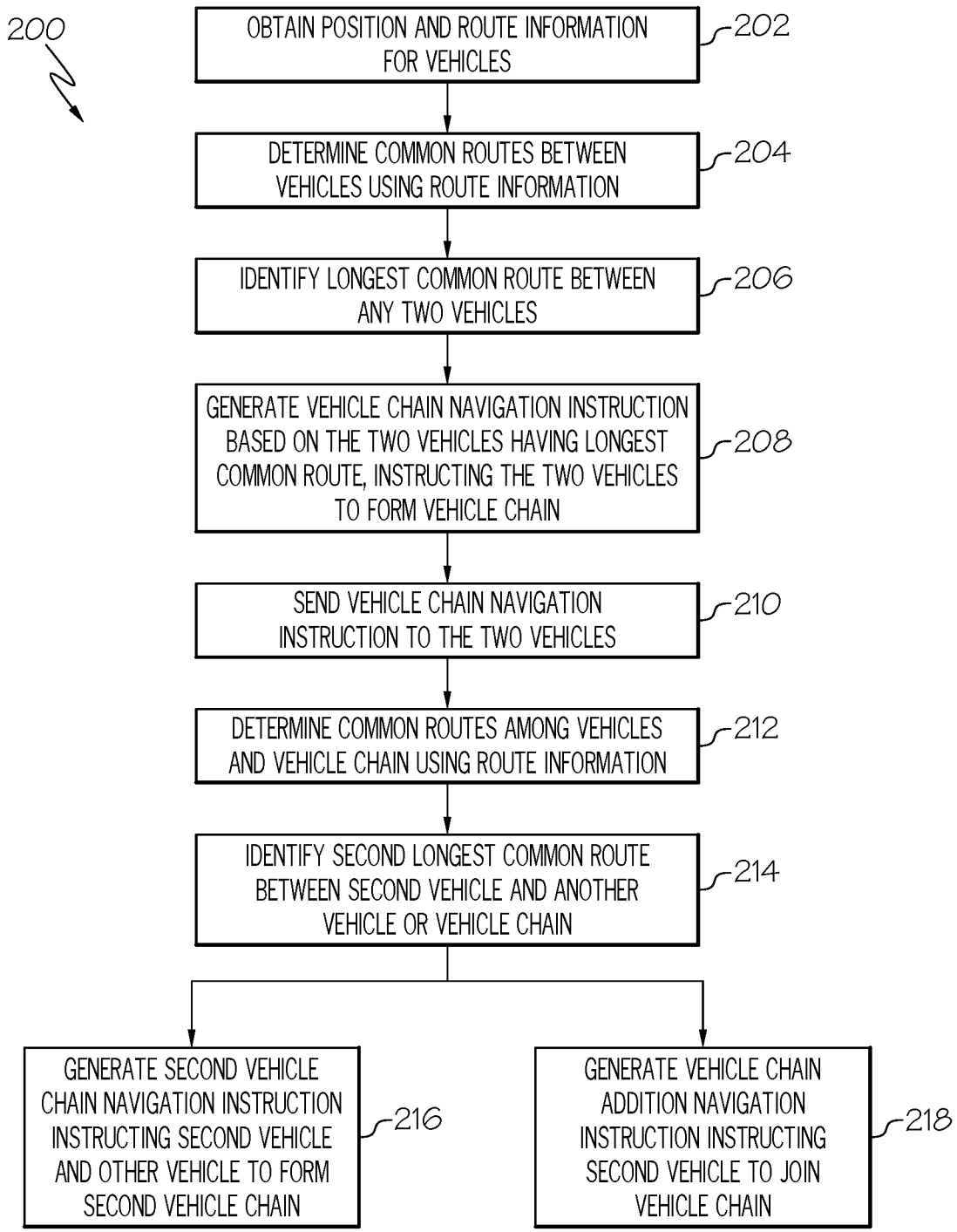
FIG. 12 shows a process flowchart for cooperative traffic flow optimization according to illustrative embodiments.

As depicted in FIG. 12, in one embodiment, a system (e.g., computer system/server 12) carries out the methodologies disclosed herein. Shown is a process flowchart 200 for cooperative traffic flow optimization. At 202, data gatherer 62 obtains a current position and route information 72 for a plurality of vehicles (e.g., vehicles 1-9) traveling on a road segment (e.g., origin point 91). At 204, chain creator 64 determines common routes between the plurality of vehicles using route information 72. At 206, chain creator 64 identifies a first longest common route between any two first vehicles of the plurality of vehicles (e.g., vehicles 8 and 9). At 208, navigation instructor 66 generates a first vehicle chain navigation instruction based on the two first vehicles having the longest common route, the first vehicle chain navigation instruction instructing the two first vehicles to form a first vehicle chain (e.g., chain 101). At 210, navigation instructor 66 sends the first vehicle chain 101 navigation instruction to the two first vehicles. At 212, chain creator 64 determines common routes among the plurality of vehicles (e.g., vehicles 1-7) and the first vehicle chain (e.g., chain 101) using route information 72. At 214, chain creator 64 identifies a second longest common route between a second vehicle (e.g., vehicle 2 or vehicle 5) and one of the following: another vehicle of the plurality of vehicles (e.g., vehicle 6) or the first vehicle chain (e.g., chain 101). At 216, navigation instructor 66 generates, in the case that the identified second longest common route is between the second vehicle (e.g., vehicle 2) and the other vehicle (e.g., vehicle 6) of the plurality of vehicles, a second vehicle chain 102 navigation instruction, the second vehicle chain navigation instruction instructing the second vehicle and the other vehicle (e.g., vehicles 2 and 6) to form a second vehicle chain (e.g., chain 102). At 218, navigation instructor 66 generates, in the case that the identified second longest common route is between the second vehicle (e.g., vehicle 5) and the first vehicle chain (e.g., vehicle 101), a vehicle chain 101 addition navigation instruction, the vehicle chain addition navigation instruction instructing the second vehicle (e.g., vehicle 5) to join the first vehicle chain (e.g., chain 101).

Process flowchart 200 of FIG. 12 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for cooperative traffic flow optimization. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for cooperative traffic flow optimization. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches for cooperative traffic flow optimization. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for cooperative traffic flow optimization, the method comprising:
 obtaining a current position and route information for a plurality of vehicles traveling on a road segment;
 determining common routes between the plurality of vehicles using the route information;
 identifying a first longest common route between any two first vehicles of the plurality of vehicles;
 generating a first vehicle chain navigation instruction based on the two first vehicles having the longest common route, the first vehicle chain navigation instruction instructing the two first vehicles to form a first vehicle chain;
 sending the first vehicle chain navigation instruction to the two first vehicles; and
 implementing the first vehicle chain navigation instruction at a navigation system of each of the first two vehicles, the implementation causing the first two vehicles to form a vehicle chain.

2. The method of claim 1, the method further comprising:
 replacing the two first vehicles with the first vehicle chain in the obtained route information for the plurality of vehicles in response to generating the first vehicle chain;
 determining common routes among the plurality of vehicles and the first vehicle chain using the route information;
 identifying a second longest common route between a second vehicle and one of the following: another vehicle of the plurality of vehicles or the first vehicle chain;
 generating, in the case that the identified second longest common route is between the second vehicle and the other vehicle of the plurality of vehicles, a second vehicle chain navigation instruction, the second vehicle chain navigation instruction instructing the second vehicle and the other vehicle to form a second vehicle chain; and
 generating, in the case that the identified second longest common route is between the second vehicle and the first vehicle chain, a vehicle chain addition navigation instruction, the vehicle chain addition navigation instruction instructing the second vehicle to join the first vehicle chain.

3. The method of claim 2, wherein, in the case that there are two or more equal distant candidate longest common routes determined among the plurality of vehicles and the first vehicle chain, the second longest common route is identified based on at least one factor selected from the group consisting of: a length of the first vehicle chain, a position of each vehicle or chain associated with each candidate longest common route, a round-robin selection, and a random selection.

4. The method of claim 1, wherein the current position and route information are retrieved from a set of navigation systems used by the plurality of vehicles.

5. The method of claim 1, wherein the plurality of vehicles traveling on a road segment are within a predetermined distance from one another.

6. The method of claim 1, wherein at least one vehicle of the plurality of vehicles is an autonomous vehicle.

7. The method of claim 1, wherein the first vehicle chain navigation instruction comprises instructions that one of the two vehicles is to be positioned behind the other of the two vehicles.

8. A computer system for cooperative traffic flow optimization, the computer system comprising:
 a memory medium comprising program instructions;
 a bus coupled to the memory medium; and
 a processor, for executing the program instructions, coupled to a chain navigation engine via the bus that when executing the program instructions causes the system to:
  obtain a current position and route information for a plurality of vehicles traveling on a road segment;
  determine common routes between the plurality of vehicles using the route information;
  identify a first longest common route between any two first vehicles of the plurality of vehicles;
  generate a first vehicle chain navigation instruction based on the two first vehicles having the longest common route, the first vehicle chain navigation instruction instructing the two first vehicles to form a first vehicle chain;
  send the first vehicle chain navigation instruction to the two first vehicles; and
  implement the first vehicle chain navigation instruction at a navigation system of each of the first two vehicles, the implementation causing the first two vehicles to form a vehicle chain.

9. The computer system of claim 8, the instructions further causing the system to:

replace the two first vehicles with the first vehicle chain in the obtained route information for the plurality of vehicles in response to generating the first vehicle chain;

determine common routes among the plurality of vehicles and the first vehicle chain using the route information;

identify a second longest common route between a second vehicle and one of the following: another vehicle of the plurality of vehicles or the first vehicle chain;

generate, in the case that the identified second longest common route is between the second vehicle and the other vehicle of the plurality of vehicles, a second vehicle chain navigation instruction, the second vehicle chain navigation instruction instructing the second vehicle and the other vehicle to form a second vehicle chain; and generate, in the case that the identified second longest common route is between the second vehicle and the first vehicle chain, a vehicle chain addition navigation instruction, the vehicle chain addition navigation instruction instructing the second vehicle to join the first vehicle chain.

10. The computer system of claim 9, wherein, in the case that there are two or more equal distant candidate longest common routes determined among the plurality of vehicles and the first vehicle chain, the second longest common route is identified based on at least one factor selected from the group consisting of: a length of the first vehicle chain, a position of each vehicle or chain associated with each candidate longest common route, a round-robin selection, and a random selection.

11. The computer system of claim 8, wherein the current position and route information are retrieved from a set of navigation systems used by the plurality of vehicles.

12. The computer system of claim 8, wherein the plurality of vehicles traveling on a road segment are within a predetermined distance from one another.

13. The computer system of claim 8, wherein at least one vehicle of the plurality of vehicles is an autonomous vehicle.

14. The computer system of claim 8, wherein the first vehicle chain navigation instruction comprises instructions that one of the two vehicles is to be positioned behind the other of the two vehicles.

15. A computer program product for cooperative traffic flow optimization, the computer program product comprising a computer readable hardware storage device, and program instructions stored on the computer readable hardware storage device, to:

obtain a current position and route information for a plurality of vehicles traveling on a road segment;

determine common routes between the plurality of vehicles using the route information;

identify a first longest common route between any two first vehicles of the plurality of vehicles;

generate a first vehicle chain navigation instruction based on the two first vehicles having the longest common route, the first vehicle chain navigation instruction instructing the two first vehicles to form a first vehicle chain;

send the first vehicle chain navigation instruction to the two first vehicles; and implement the first vehicle chain navigation instruction at a navigation system of each of the first two vehicles, the implementation causing the first two vehicles to form a vehicle chain.

16. The computer program product of claim 15, the computer readable storage device further comprising instructions to:

replace the two first vehicles with the first vehicle chain in the obtained route information for the plurality of vehicles in response to generating the first vehicle chain;

determine common routes among the plurality of vehicles and the first vehicle chain using the route information;

identify a second longest common route between a second vehicle and one of the following: another vehicle of the plurality of vehicles or the first vehicle chain;

generate, in the case that the identified second longest common route is between the second vehicle and the other vehicle of the plurality of vehicles, a second vehicle chain navigation instruction, the second vehicle chain navigation instruction instructing the second vehicle and the other vehicle to form a second vehicle chain; and generate, in the case that the identified second longest common route is between the second vehicle and the first vehicle chain, a vehicle chain addition navigation instruction, the vehicle chain addition navigation instruction instructing the second vehicle to join the first vehicle chain.

17. The computer program product of claim 16, wherein, in the case that there are two or more equal distant candidate longest common routes determined among the plurality of vehicles and the first vehicle chain, the second longest common route is identified based on at least one factor selected from the group consisting of: a length of the first vehicle chain, a position of each vehicle or chain associated with each candidate longest common route, a round-robin selection, and a random selection.

18. The computer program product of claim 15, wherein the current position and route information are retrieved from a set of navigation systems used by the plurality of vehicles and wherein the plurality of vehicles traveling on a road segment are within a predetermined distance from one another.

19. The computer program product of claim 15, wherein at least one vehicle of the plurality of vehicles is an autonomous vehicle.

20. The computer program product of claim 15, wherein the first vehicle chain navigation instruction comprises instructions that one of the two vehicles is to be positioned behind the other of the two vehicles.

\* \* \* \* \*